US005571227A

United States Patent [19]
Pisarek

[11] Patent Number: 5,571,227
[45] Date of Patent: Nov. 5, 1996

[54] APPARATUS FOR HOLDING A FISHING POLE

[76] Inventor: William S. Pisarek, 305 Marose Dr., Pittsburgh, Pa. 15235

[21] Appl. No.: 377,471

[22] Filed: Jan. 24, 1995

[51] Int. Cl.⁶ .................................................... A01K 97/10
[52] U.S. Cl. ............................ 43/21.2; 248/513; 248/514
[58] Field of Search ............................ 43/21.2; 248/513, 248/514, 518, 519, 525, 538, 456

[56] References Cited

U.S. PATENT DOCUMENTS

| | | | |
|---|---|---|---|
| 2,438,388 | 3/1948 | Dolk | 43/21.2 |
| 2,973,929 | 3/1961 | Zawadzki | 248/514 |
| 3,204,899 | 9/1965 | Danielewicz | 248/514 |
| 3,701,504 | 10/1972 | Woods | 248/513 |
| 4,479,322 | 10/1984 | Koppel | 43/21.2 |
| 4,523,403 | 6/1985 | Ivy | 43/21.2 |
| 4,550,520 | 11/1985 | Bogue | 43/21.2 |
| 4,908,973 | 3/1990 | Perks | 43/16 |
| 5,152,494 | 10/1992 | Frunzar | 43/21.2 |

*Primary Examiner*—Kurt Rowan
*Attorney, Agent, or Firm*—James Ray & Associates

[57] ABSTRACT

Apparatus for holding and supporting one or more fishing poles in a fishing position having frame structure with a support means adapted to support the frame structure on a generally horizontal surface and in an inclined vertical orientation, the frame structure having a fishing pole handle engaging device at the base and a transverse support structure adapted to laterally support a mid-length portion of the fishing poles, such that one or more fishing poles can be supported on the frame structure in a generally inclined vertical orientation, with the handles thereof engaged by the handle engaging device, and a mid-length portion thereof resting against the transverse support structure. Ideally, the transverse support structure is made of a flexible material, and the fishing poles are made to extend between a pair of elongated members on the frame structure adapted to prevent the fishing poles from being pulled from the frame structure.

18 Claims, 2 Drawing Sheets

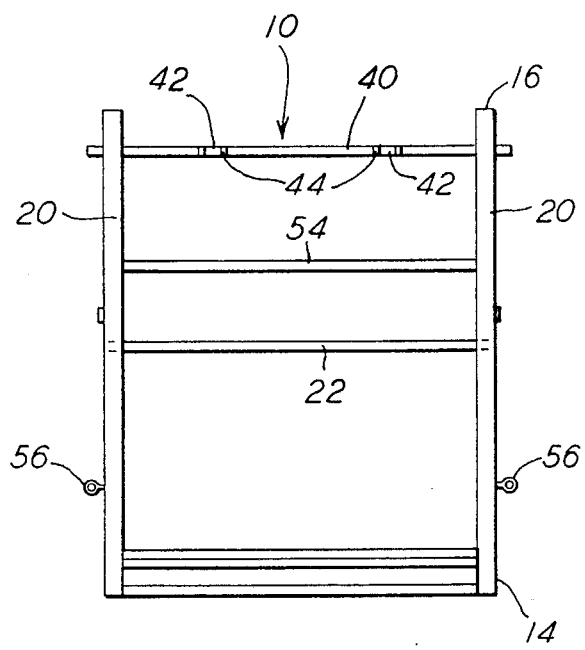
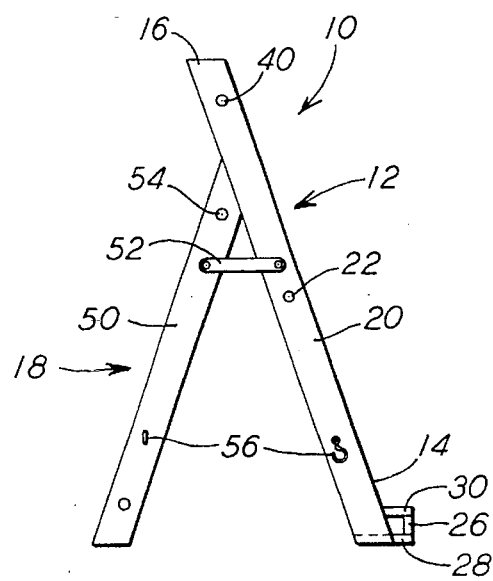
FIG. 1　　　　　FIG. 2
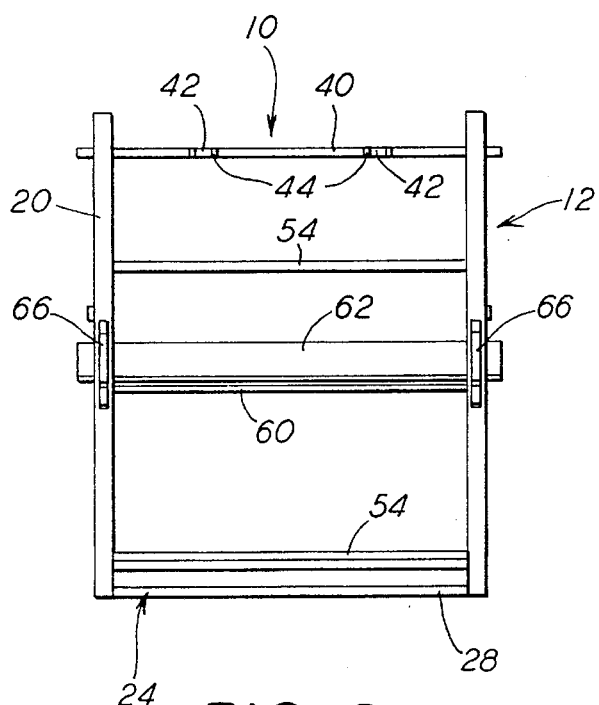
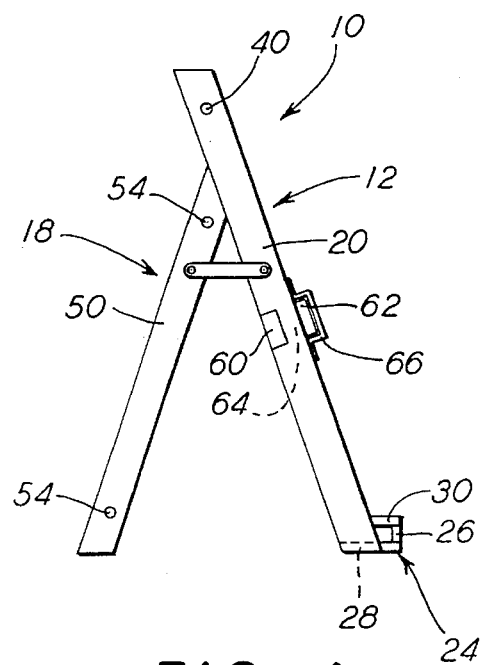
FIG. 3　　　　　FIG. 4

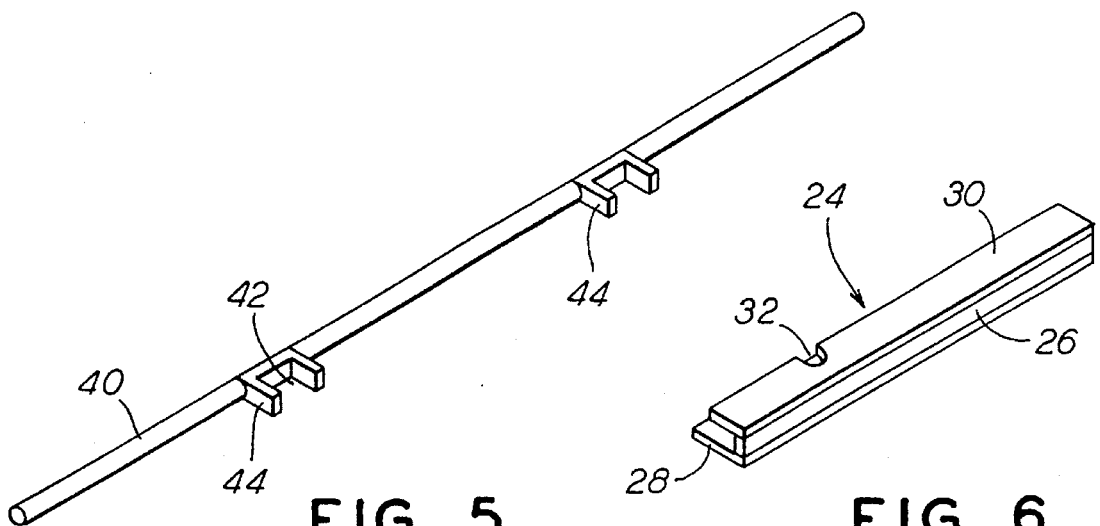
FIG. 5
FIG. 6
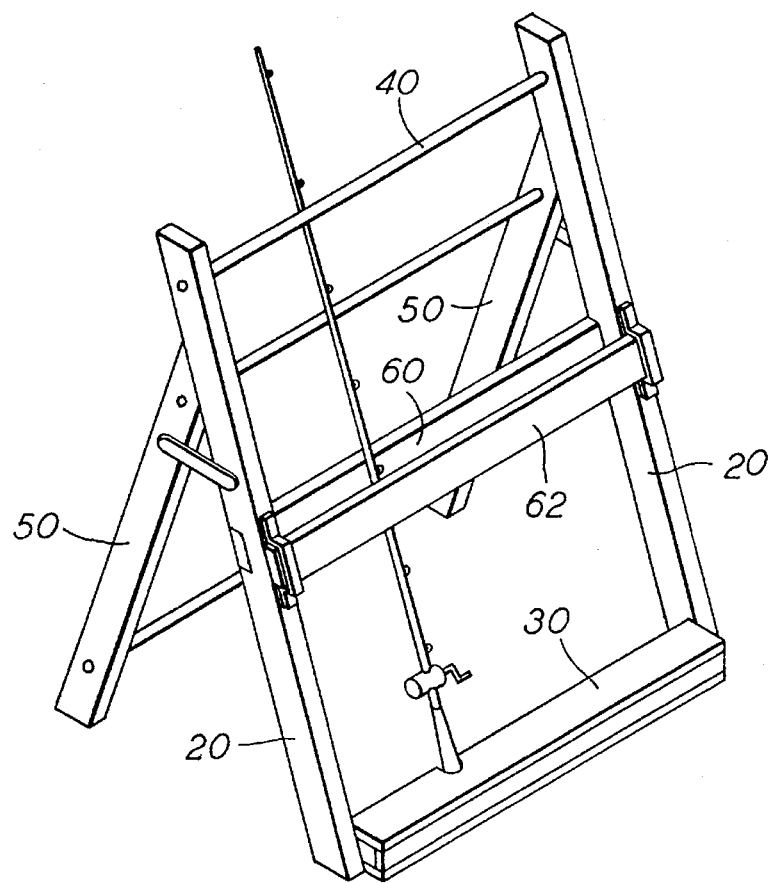
FIG. 7

APPARATUS FOR HOLDING A FISHING POLE

FIELD OF THE INVENTION

This invention relates generally to apparatus for holding a fishing pole, and more particularly to a portable, fold-up apparatus capable of simultaneously supporting and holding one or more fishing poles in a fishing position, and which can optionally lock such fishing pole or poles to the apparatus, and further optionally provide a signal when a fish strikes a fish line extending from a pole supported by the apparatus.

BACKGROUND OF THE INVENTION

Fishing is an activity enjoyed by many persons which can take several different forms of effort and concentration. To some, fishing is a rather active sport, pursued in earnest with a reasonable level of concentration, such as deep-sea and fly fishing. To others, fishing is a leisurely, relaxing endeavor, such as sitting at the side of lake, river or stream, with fishing pole in hand, and otherwise enjoying an additional activity, such as reading, eating, conversing with a companion, or simply just relaxing. In many such relaxed fishing efforts, particularly when the fish are not biting regularly, such fisherman or fisherwoman, are known to lay their fishing pole on the ground, often propped-up by boulders, tree branches or the like, and just relax at the water's edge until a fish strikes the fishing line. While this does permit the fisherman or fisherwoman to free their hands to eat or otherwise be more relaxed, a particularly hard hit on the fish line at such a time can lead to problems including one's loss of their fishing pole. That is to say, if a large fish should take the fish line, the fishing pole can be pulled into the water and lost forever. If not entirely lost, the fishing pole can be caused to be pulled through mud, water-side weeds and other debris, such that the fishing pole, and any attached reel, will have to be cleaned before any further enjoyable use.

SUMMARY OF THE INVENTION

This invention is predicated on my conception and development of a stand or portable apparatus for holding one or more fishing poles in a fishing position, which can include fold-up support legs to enhance portably, as well as locking means to prevent the fishing pole or poles from being pulled from the apparatus, as well as provide a signal when a fish has struck a fish line extending from a pole supported by the apparatus. In essence, the apparatus comprises frame structure having a base side and an upper side opposite and spaced from the base side, and an upright support means adapted to support the frame structure on a generally horizontal surface, such as the ground, bridge deck or the like, in a generally inclined vertical orientation, with the base side of the frame structure disposed in a lowermost position adjacent to such horizontal surface. The base side of the frame structure should include a handle support means adapted to support and retain at least one fishing pole handle, while the upper side of the frame structure includes a transverse support means adapted to laterally support a mid-length portion of the fishing pole or poles, such that the one or more fishing poles can be supported on the frame structure in a generally inclined vertical orientation, with a handle thereof engaged by the handle support means, and a mid-length portion thereof resting against the transverse support means. In this way, the fisherman or fisherwoman can properly position his or her fishing pole or poles at the water's edge, keeping his or her hands free for other activities, or enhance their relaxed condition.

In addition to the above essential elements of the apparatus, the upright support means can comprise one or more support legs that are pivotally attached to the frame structure to enhance its portability. The transverse support means, on the other hand, can not only include one or more grooves to better support a mid-length portion of the fishing pole or poles, but can be made of a flexible material which is flexed when a fish hits the fish line, thereby better visually indicating the fact that a fish has hit a fish line. In addition, a signal means such as a bell can be attached to the flexible transverse support means which will provide an audible signal when the transverse support means is flexed, further indicating that a fish has hit a fish line.

The fishing pole handle support means can comprise a simple channel member adapted to merely support the handle out of contact with a wet or muddy ground surface, and can preferably include means such as a member having one or more grooves into which the handle or handles can be fitted to better support the handles in position. In addition, means can be included to virtually lock the fishing pole or poles into position on the frame structure, such as a first transverse structural member adapted to extend across an underside of the fishing pole or poles supported on the frame structure, with a second transverse structural member adapted to be positioned against frame structure generally parallel to the first transverse structural member to form a narrow slot between the two transverse structural members, such that any fishing pole supported on such frame structure will have to extend through the narrow slot, thereby locking it in place. Particularly if the fishing pole or poles are provided with a reel or reels, and are positioned below the above described slot, the reel or reels will serve as an obstruction unable to pass through the narrow slot.

OBJECTS OF THE INVENTION

Accordingly, it is a primary object of this invention to provide a simple and inexpensive portable apparatus for holding and supporting one or more fishing poles while such fishing pole or poles are being utilized for fishing purposes, which will permit the fisherman or fisherwoman to free their hands for other activities or to be more relaxed.

It is another object of this invention to provide a simple and inexpensive portable apparatus for holding and supporting one or more fishing poles while such fishing pole or poles are being utilized for fishing purposes, which is provided with fold-up support legs to enhance its portability.

It is a further object of this invention to provide a simple and inexpensive portable apparatus for holding and supporting one or more fishing poles while such fishing pole or poles are being utilized for fishing purposes, which is provided with a flexible transverse support means capable of providing a signal when a fish has hit a fish line.

It is still another object of this invention to provide a simple and inexpensive portable apparatus for holding and supporting one or more fishing poles while such fishing pole or poles are being utilized for fishing purposes, which includes means for locking the fishing pole or poles to the apparatus to prevent such pole or poles from being pulled from the apparatus when a fish hits a fish line.

These and other objects and advantages will become apparent from a full understanding of the following detailed description of the invention, particularly when considered in view of the attached figures.

BRIEF DESCRIPTION OF THE DRAWINGS

FIG. 1 is an elevational front view of a presently preferred embodiment of the apparatus of this invention.

FIG. 2 is an elevational side view of the apparatus shown in FIG. 1.

FIG. 3 is an elevational front view of another embodiment of this invention which is substantially the same as that shown in FIG. 1, except that the apparatus shown is provided with means for virtually locking one or more fishing poles within the apparatus.

FIG. 4 is an elevational side view of the apparatus shown in FIG. 3.

FIG. 5 is an isometric view of a portion of the transverse support means having a pair of U-channels attached thereto to provided grooves to support fishing poles at mid-length.

FIG. 6 is an isometric view of a portion of the handle support means illustrating a groove for supporting a fishing pole handle.

FIG. 7 is an isometric view of the embodiment of this invention shown in FIG. 3 further illustrating a fishing pole secured thereto.

DESCRIPTION OF THE PREFERRED EMBODIMENTS OF THE INVENTION

Prior to proceeding with a detailed description of the subject invention, it is noted that for the sake of clarity, identical components which have identical functions have been identified with identical reference numerals throughout the several views of the attached drawings.

Reference to FIGS. 1 and 2 will illustrate a presently preferred embodiment of this invention, namely an apparatus for holding and supporting at least one fishing pole in the fishing position, generally designated 10, which comprises a frame structure 12, having a base side 14 and an upper side 16 opposite and spaced from the base side 14, plus an upright support means 18, adapted to support the frame structure 12 on a generally horizontal surface, and in a generally inclined vertical orientation, with the base side 14 disposed in a lowermost position adjacent to a generally horizontal surface, such as the ground, a bridge surface or any other surface upon which the user wishes to place his or her fishing pole or poles.

While the frame structure 12 can have any desired configuration, a reasonably straight and flat base side 14 is most desirable, and hence a generally rectangular overall configuration is preferred. As more specifically illustrated in FIGS. 1 and 2, frame structure 12 is made up of a pair of generally parallel and spaced side frame members 20, such as a pair of 2×4s or 2×3s, held in such a spaced relationship by at least two spaced cross member supports 22, positioned to maintain side frame members 20 in a rigid, spaced and parallel relationship. The base side 14 of frame structure 12 should include a handle support means 24 comprising, or incorporated with, the base side 14, adapted to support and retain the base end of at least one fishing pole handle, to prevent the handle from contact with the ground, which may be muddy or wet. The handle support means 24 should include some sort of a front side support structure, such as wall member 26 which extends vertically from base support member 28, which serves to assure that the fishing pole handle or handles remain in position on the upper surface of base support member 28, so that any pulling force on a fish line, or tipping force on the fishing pole, will not normally cause a fishing pole handle, resting on support member 28, to be moved over the edge thereof and onto the ground surface. In the preferred embodiment illustrated in FIGS. 1 and 2, a notch member 30, having one or more notches 32, is secured to the upper surface of wall member 26. The notches 32, which can simply comprise semi-circular cut-out portions on the back edge of notch member 30, should be adapted to engage a fishing pole handle, and serve to keep the handle resting on support member 28, from being moved laterally along the width of support member 28. If the handle support means 24 is rigidly secured to the pair of side frame members 20, as shown, the handle support means 24 will serve as a cross member support, so that an individual cross member support 22 will not be necessary on the base side 14 of frame structure 12.

While the base side 14 of frame structure 12 should include a handle support means 24, as described above, the upper side 16 of frame structure 12 should include a transverse support means 40, adapted to laterally support a mid-length portion of at least one fishing pole, such that at least one fishing pole can be supported on the frame structure 12 in a generally inclined vertical orientation, with a handle thereof supported by the handle support means 24, and a mid-length portion resting against the transverse support means 40. While transverse support means 40 can comprise a rigid member, and thereby serve as a cross member support 22, it is preferred that transverse support means 40 be made of a flexible material, so that in the event a fish hits a fish line extending from a fishing pole supported by the apparatus 10, the pulling action of the fish line will cause the transverse support means 40 to be visibly flexed, sufficient to be seen by the user so that he or she will know that a fish has hit the fish line. At this point then, the user can lift the fishing pole from the apparatus 10, and pursue efforts to hook the fish. In addition to the visible signal provided by the flexible transverse support means 40, an audible signal means can also be attached to transverse support means 40, such as a bell, which will ring when the transverse support means 40 is flexed. It is also highly preferable that transverse support means 40 be provided with one or more grooves 42 for the purpose of keeping the mid-section of the fishing pole or poles in position relative to the width of the transverse support means 40. As illustrated particularly in FIG. 5, the grooves 42 can be provided by attaching a small U-section structure 44 to transverse support means 40. Ideally of course, grooves 42 should be equal in number and aligned with notches 32 in notch member 30. Therefore, a fishing pole can be better supported on apparatus 10, with its handle retained in position within a notch 32, while its mid-length portion is retained within a mating groove 44 vertically aligned thereabove. In this manner more that one fishing pole can be supported on apparatus 10, such that the fishing poles are parallel and spaced apart and do not interfere with each other. Although sizing is not critical, an ideal size for the frame structures has been those measuring generally about 16 inches in width and about 20 inches in length.

The upright support means 18 can comprise any form of attachment to frame structure 12 that is adapted to support frame structure 12 on a generally horizontal surface and in a generally inclined vertical orientation, with the base side 14 disposed in a lowermost position adjacent to a horizontal surface such as the ground surface. While such an upright support means 18 can simply comprise a leg member rigidly attached to the back side of frame structure 12, and extending towards the base side at an oblique angle, it is preferred that such a support means 18 be foldably attached, for the purpose of enhancing portability of the apparatus 10. In the embodiment illustrated in FIGS. 1 and 2, the upright support means 18 comprises a pair of leg members 50, with one each simply attached to one each of the side frame members 20, with a pivotally attached steel strap 52. The upper end of each leg member 50 is provided with an angular cut, so that it can be made to pivotally mate with the back side surface of the side frame members 20 when steel straps 52 are fully extended horizontally. For portability, the individual leg members 50 can be positioned to abut in a parallel position against the back side of side frame members 20, and to simplify set-up and fold-up, a pair of cross member supports 54 can be provided so that leg members 50 are foldably or pivotally positioned in unison. If desired, one or more simple latch mean 56, such as simple hooks and eyes, can be provided to latch leg members 50 against side frame members 20, to better maintain the folded-up, portable arrangement. Although this design is simple to produce, and will permit some degree of adjustment with regard to irregular ground surfaces, it should be apparent that a more complex hinged arrangement could be utilized, such as the hinged linkage utilized on step ladders, or any other type hinged connection that will support the frame structure 12 in an inclined vertical position.

Reference to FIGS. 3 and 4 will illustrate another embodiment provided with a locking means which will prevent the fishing pole or poles from being pulled from the apparatus 10. This embodiment is substantially like that disclosed above, except that this embodiment also includes a first transverse structural member 60 adapted to extend horizontally across the underside of any and all fishing poles supported on frame structure 12, and further includes a second transverse structural member 62, adapted to be positioned against the front surface of frame structure 12 generally parallel to the first transverse structural member 60, for the purpose of forming a narrow slot 64 between the first and second transverse structural members 60 and 62, such that any fishing pole supported on the frame structure 12 will have a portion extending through the narrow slot 64. With this structure in place, any force, such as a large fish or otherwise, which would tend to pull on the fish line with sufficient force to pull the fishing pole from the apparatus 10, would necessarily mean that the fishing pole would have to be pulled through narrow slot 64. If the thickness of any fishing pole component below the narrow slot 64, such as a fishing reel or the handle, is thicker than the slot, then the fishing pole cannot be pulled therethrough, and the narrow slot 64 will block its further withdrawal.

The make-up of the transverse structural members 60 and 62 is not critical, as transverse structural member 60, for example can be one of the cross member supports 22. The transverse structural member 62, can be any elongated, rigid member that can be positioned against frame structure 12 in a parallel relationship to transverse structural member 60, and sufficiently spaced therefrom to form the narrow slot 64. As shown in FIGS. 3 and 4, transverse structural member 62, simply comprises an elongated beam, such as a 2×4 or 2×3 horizontally insertable through channel fittings 66, rigidly secured to side frame members 20 adjacent to the ends of transverse structural member 60. If preferred, transverse structural member 62 can be secured to a pair of side arms pivotally secured to side frame members so that it can be pivotally moved into and out of position.

It should be apparent from the above discussion that a number of other embodiments and modifications could be utilized in the invention as described without departing from the spirit of the invention. Particularly the handle support means 24 could take various forms other than that described. For example, instead of the notches, counter sunk bores can be provided within base support member 28 into which the handles can be inserted. It should be further noted that the apparatus as disclosed and shown in the figures, were made of wood in a home work shop. Obviously, if commercially manufactured, the inventive apparatus would more ideally be made of a molded plastic material.

I claim:

1. An apparatus for holding and supporting at least one fishing pole while such at least one fishing pole is being utilized for fishing purposes, said apparatus comprising:

(a) a frame structure having a base side and an upper side opposite and spaced from said base side;

(b) an upright support means adapted to support said frame structure on a generally horizontal surface in a generally inclined vertical orientation, with said base side disposed in a lowermost position adjacent to such generally horizontal surface;

(c) a handle support means at said base side comprising a horizontally disposed, elongated channel structure adapted to retain a handle of such at least one fishing pole over such generally horizontal surface, said elongated channel having at least one notch adapted to receive such handle and prevent lateral displacement thereof;

(d) a transverse support means at said upper side adapted to laterally support a mid-length portion of such at least one fishing pole, such that such at least one fishing pole can be supported on said frame structure in a generally inclined vertical orientation, with such handle thereof engaged by said handle engaging means, and such mid-length portion thereof resting against said transverse support means; and (e) a first transverse structural member attached to said upright support means between said handle support means and said transverse support means adapted to extend across an underside of such at least one fishing pole supported on said frame structure, and a second transverse structural member adapted to be positioned against said frame structure generally parallel to said first transverse structural member to form a slot between said first and second transverse structural members, such that any fishing pole supported on said frame structure will have a portion thereof above such fishing pole handle extending through said slot, said slot being sized to permit such portion to extend therethrough but prevent such handle from being pulled therethrough.

2. An apparatus for holding and supporting at least one fishing pole, according to claim 1, in which said upright support means comprises at least one support leg extending at an angle from said frame structure.

3. An apparatus for holding and supporting at least one fishing pole, according to claim 2, in which said at least one support leg is foldable with respect to said frame structure to enhance portability of said apparatus.

4. An apparatus for holding and supporting at least one fishing pole, according to claim 1, in which said frame structure is generally rectangular in form.

5. An apparatus for holding and supporting at least one fishing pole, according to claim 4, in which said generally rectangular frame structure includes a pair a generally parallel and spaced side frame members.

6. An apparatus for holding and supporting at least one fishing pole, according to claim 5, in which said flexible transverse support means comprises an elongated member attached to and adapted to span generally horizontally between said generally parallel side frame members.

7. An apparatus for holding and supporting at least one fishing pole, according to claim 6, in which a signal means is attached to said flexible transverse support means adapted to provide a signal when said flexible transverse support means is flexed.

8. An apparatus for holding and supporting at least one fishing pole, according to claim 7, in which said signal means is a bell.

9. An apparatus for holding and supporting at least one fishing pole, according to claim 5, in which said upright support means comprises a pair of legs members, one each foldably attached to one each of said side frame members.

10. An apparatus for holding and supporting at least one fishing pole, according to claim 9, in which said pair of leg members are interconnected by at least one cross bar member and adapted to be simultaneously foldable in unison.

11. An apparatus for holding and supporting at least one fishing pole, according to claim 10, including a latching means for latching said leg members in a folded position against said side frame members.

12. An apparatus for holding and supporting at least one fishing pole, according to claim 1, in which said slot is formed above a reel secured on any fishing pole supported on said frame structure and is sized to prevent such a reel from being pulled therethrough.

13. An apparatus for holding and supporting at least one fishing pole, according to claim 1, in which said flexible transverse support means includes at least one groove adapted to receive a mid-length portion of a fishing rod and prevent lateral displacement thereof.

14. An apparatus for holding and supporting at least one fishing pole, according to claim 13, in which said at least one groove is provided within a U-channel attached to said transverse support means.

15. An apparatus for holding and supporting at least one fishing pole, according to claim 13, in which said at least one groove is aligned with said at least one notch.

16. An apparatus for holding and supporting at least one fishing pole, according to claim 1, in which said frame member has dimensions of generally about 16 inches in width and about 20 inches in length.

17. An apparatus for holding and supporting at least one fishing pole while such at least one fishing pole is being utilized for fishing purposes, said apparatus comprising:
(a) frame structure having a base side and an upper side opposite and spaced from said base side;
(b) an upright support means adapted to support said frame structure on a generally horizontal surface in a generally inclined vertical orientation, with said base side disposed in a lowermost position adjacent to such horizontal surface;
(c) a handle support means at said base side adapted to retain at least one fishing pole handle;
(d) a transverse support means at said upper side adapted to laterally support a mid-length portion of at least one fishing pole, such that at least one fishing pole can be supported on said frame structure in a generally inclined vertical orientation, with a handle thereof engaged by said handle support means, and such mid-length portion thereof resting against said transverse support means;
(e) a first transverse structural member disposed on said frame structure above said base side thereof adapted to extend across an underside of at least one fishing pole supported on said frame structure; and
(f) a second transverse structural member adapted to be positioned against said frame structure generally parallel to said first transverse structural member to form a slot between said first and second transverse structural members, such that any fishing pole supported on said frame structure will have a portion thereof above such fishing pole handle extending through said slot, said slot being sized to permit such portion to extend therethrough but prevent such handle from being pulled therethrough.

18. An apparatus for holding and supporting at least one fishing pole, according to claim 17, in which said slot is formed above a reel secured on any fishing pole supported on said frame structure and is sized to prevent such a reel from being pulled therethrough.

* * * * *

UNITED STATES PATENT AND TRADEMARK OFFICE
CERTIFICATE OF CORRECTION

PATENT NO. : 5,571,227
DATED : November 5, 1996
INVENTOR(S) : William S. Pisarek It is certified that error appears in the above-identified patent and that said Letters Patent is hereby corrected as shown below:

Column 3, line 16, please delete "provided" and insert --provide--.

Column 4, line 50, after "manner", please insert --,--;

column 4, line 50, please delete "that" and insert --than--.

Column 5, line 13, please delete "mean" and insert --means--.

Column 6, line 61, please delete "a (second occurrence), and insert --of--.

Signed and Sealed this

Fourteenth Day of July, 1998

Attest:

BRUCE LEHMAN

Attesting Officer

Commissioner of Patents and Trademarks